Nov. 12, 1929.  E. G. KIMMICH  1,735,686
BELT JOINT AND METHOD OF MAKING THE SAME
Filed June 2, 1926
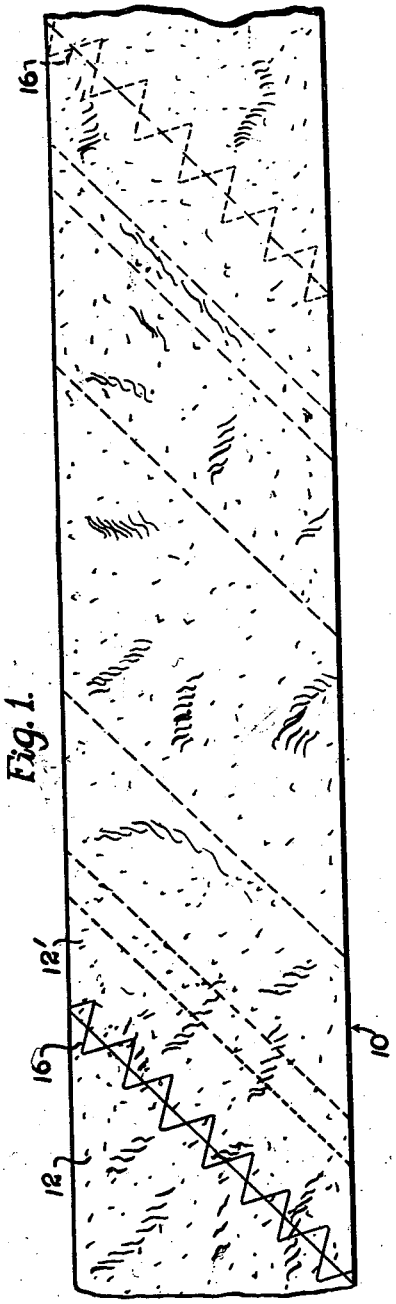
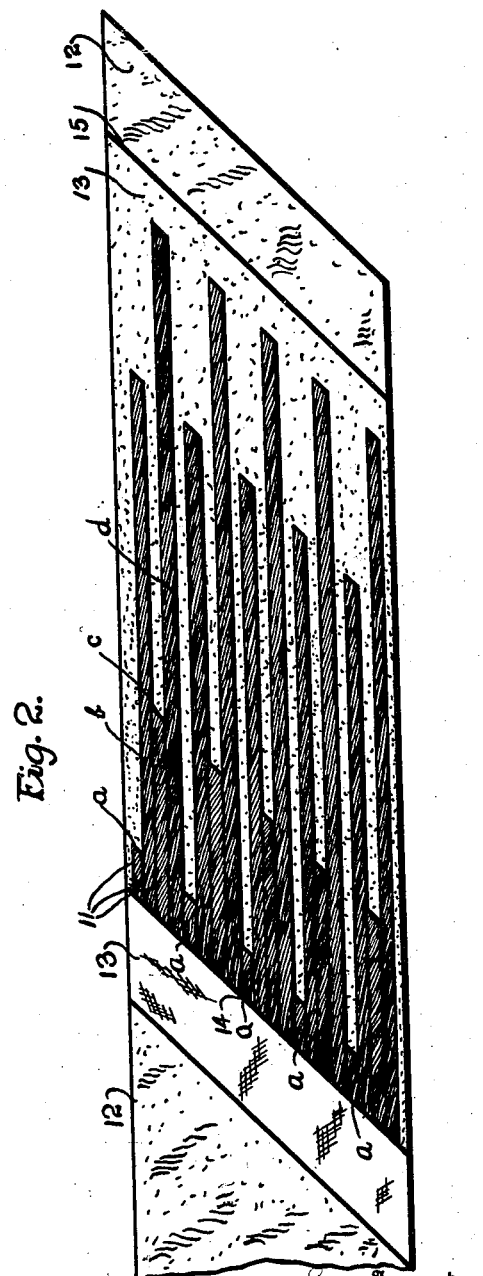
Inventor
Elmer G. Kimmich.
By R.S. Trogner
Attorney Patented Nov. 12, 1929

1,735,686

UNITED STATES PATENT OFFICE

ELMER G. KIMMICH, OF AKRON, OHIO, ASSIGNOR TO THE GOODYEAR TIRE & RUBBER COMPANY, OF AKRON, OHIO, A CORPORATION OF OHIO

BELT JOINT AND METHOD OF MAKING THE SAME

Application filed June 2, 1926. Serial No. 113,144.

My invention relates to belting, and it has particular reference to means for joining or splicing power transmission belts which include a plurality of longitudinally disposed cords.

Practically all of the cord belts employed heretofore have been formed in continuous lengths, and have been utilized for purposes, such as automobile fan drives, where a belt of relatively short length is suitable. Cord belts have not been employed, generally, for power transmission equipment, where the driving and driven members were materially spaced, inasmuch as this type of belting was not regarded as satisfactory for such use. However, recent improvements in the manufacture and construction of cord belting have rendered this product highly suitable for power transmission purposes in installations requiring the employment of belts of relatively long length, such, for example, as are utilized in oil well pumping installations or the like. Obviously, it is not feasible to manufacture such belts in continuous lengths, and it is desirable, therefore, to splice or to secure the ends of the belt to each other.

The ordinary types of belt splices or securing means are not adapted for use in connection with cord belts. If the ends of the belt be overlapped and be secured by rivets, the joint thus formed is unsatisfactory for several reasons. In the first instance, the overlapped ends formed a rough spot in the belt, which results in considerable pounding during use. Furthermore, the fibers constituting the cords extend in the same direction, and hence, rivets, or similar securing means, pull out quite readily. If, in a flush joint, the cords be cut along a single line, there results a zone of great weakness, for, at the line of severance of the cords, substantially all of the force transmitted must be sustained by the fabric envelope, and not by the cords themselves.

It is apparent, therefore, that the provision of a satisfactory splice for cord belting presents a problem quite different from that which must be considered in connection with leather or laminated fabric belting.

It is the object of the invention to provide means for joining or splicing the ends of cord belting in such manner as to distribute the forces tending to disrupt the belt, and thereby to impart to the belt a greater load transmitting capacity.

In the drawings:

Fig. 1 is a plan view of a portion of a cord belt, showing the completed splice; and Fig. 2 is a plan view of an end of a belt that has been prepared for splicing.

The belt, herein described to illustrate the principles of the invention, consists of an envelope 10 of rubberized fabric which encloses a plurality of longitudinally disposed rubberized cords 11. Any number of fabric plies may be used in the envelope, and likewise, the number of cords employed may vary over wide limits, depending usually upon the width of the belt. Power is transmitted primarily through the separate cords, and the fabric is employed essentially as a protective covering, rather than as a power transmission element.

Preferably, the end portion of the belt is prepared for splicing by cutting the upper portion of the envelope 10 at an angle to the longitudinal axis of the belt, and in cutting away the respective plies 12 and 13, to expose a portion of each. A portion of the envelope is then removed from one side of the belt, by cutting along the edges thereof, to expose a sufficient length of the cords 11. The other side of the belt at the end portion thereof is also cut at an angle to expose portions of the plies 12 and 13 in the reverse order from that followed when making the first cutting.

The respective cords are cut away between the edges 14 and 15 of the inner ply 13, in such manner that the cords terminate at a plurality of spaced points. For example, in Fig. 2, the cords are grouped in sets, and they are respectively indicated by the letters, $a$, $b$, $c$, and $d$. The cord $b$ is so cut as to have a materially greater length than the adjacent cords $a$ and $c$, but it is shorter than the remote cord $d$. Likewise, the cords $a$ and $c$ are of different lengths. The individual cords $a$ are all of the same exposed length, but their ends are spaced materially, inasmuch as the cords $b$, $c$, and $d$, intervene between any pair of cords $a$.

The cords are cut at an angle to the longitudinal axis of the belt, and, as illustrated, their ends define a plurality of terminal lines, spaced from each other, and parallel to the lines at which the plies of the envelope were cut.

Obviously, the order of lengths illustrated need not be followed in every splice. Thus, the lengths of the cords, $a$, $b$, $c$, and $d$, could be so determined that the cord $b$ is shorter than either cord $a$ or cord $c$. It should also be observed that if the belt contained a large number of cords, the four adjacent cords $a$, $b$, $c$, and $d$, could be made of the same length, and the next set of cords, $a$, $b$, $c$, and $d$, could also be made equal in length to each other, but of a different length from the first set. The number of cords comprising any set need not be limited to four, but may be made any acceptable value.

There results, from this method of cutting, a plurality of remotely spaced points of termination, within the splice, for the respective cord elements.

The opposite end of the belt, or the end which is to be joined to that illustrated, is cut in such manner that when it is superposed upon the end shown, the two parts fit snugly upon each other. Thus, the opposite end of the belt should be formed with an exposed portion of its outer ply 12' having a length and area equal to the exposed portion of the inner ply 13. The longest cords of the second end should extend from the ends of the cords $a$ to the edge 15 of the inner fabric ply 13. The shortest cords should be made of sufficient length to fill the space between the ends of the cords $d$ and the edge 15. In other words, the exposed lengths of any pair of abutting cords should be equal to the distance between the edges 14 and 15 of the inner ply 13.

The two ends are treated with a coating of vulcanizable rubber or cement, and are then superposed and are pressed firmly one against the other. The exposed edges of the outer plies 12 and 12' of the ends of the belt fit snugly against each other, and they are secured by suitable means, such as stitches 16, which, preferably, do not extend entirely through the belt. The manner of applying the stitch may be varied, but it is preferred to employ the method described and claimed in my co-pending application for a belt joint, No. 59,845, filed October 1, 1925. The splice is then vulcanized under pressure, to form a continuous belt having a smooth and uninterrupted surface.

It will be observed that, in the splice illustrated, the cords of either end are so disposed that they are interposed, for a portion of their length, with the cords extending from the opposite end. Upon vulcanization, a firm bond of rubber is formed between the cords, and it serves to secure the cords extending from either end to each other. Power is transmitted from the cords of one end through the contacting cords of the other end, to which they are firmly secured by means of the vulcanizing process. This mode of operation is more efficient than that obtained in a straight cut splice or butt joint, wherein all of the cords are disposed end to end, and not side by side.

A belt joined in the manner described has a particularly high power transmitting capacity. The forces which tend to separate the ends of the belt are distributed over substantially the entire splice, and, inasmuch as the length of the splice may be made any value desired, the stress is imposed over an appreciable portion of the belt. This stress distribution results in an increase in the power transmitting capacity of the belt, inasmuch as the weakest portion thereof, namely, the splice, may be made to sustain a load which approximates that which could be carried by any unbroken section.

It will be apparent, therefore, that there is provided a belt joint having peculiarly desirable characteristics. The surface of the belt is uninterrupted, and hence, destructive pounding actions are avoided. The strength of the belt at the joint is much higher than that which could be attained if rivets or like securing means were employed, and the splice may be so dimensioned that its strength approximates very closely the theoretical load carrying capacity of the belt.

Many variations in the manner of cutting the respective cords, from that shown for the purpose of illustration, will occur to those skilled in the art, and hence, it is to be understood that the invention is not to be limited to the specific illustration described. Only such limitations should be imposed upon the invention as are set forth in the following claims.

What I claim is:

1. The method of joining the ends of rubberized fabric and cord belts which comprises removing a portion of the fabric to expose the ends of the cords, removing portions of the cords so that the ends thereof are staggered, forming a similar configuration at another end, coating the ends with vulcanizable rubber, superposing the ends and vulcanizing the joint.

2. An article of manufacture comprising a splice for joining the ends of rubberized fabric and cord belts, one end of the belt having portions of the ends of the cords so removed that the ends are staggered, the other end of the belt similarly having end portions of its cords removed, said ends of the belts being superposed in complementary relation, and rubber on the end portions of the cords for retaining the ends of the belt together.

3. An article of manufacture comprising a splice for joining the ends of rubberized fabric and cord belts, one end of the belt having portions of the ends of the cords so removed that the ends are staggered and disposed in lines diagonal to the length of the belt, the other end of the belt similarly having end portions of its cords removed, said ends of the belts being superposed in complementary relation, and rubber on the end portions of the cords for retaining the ends of the belt together.

4. The method of joining the ends of rubberized fabric and cord belts which comprises removing a portion of the fabric to expose the ends of the cords, removing portions of the cords so that the ends thereof are staggered and disposed in lines diagonal to the length of the belt, forming a similar configuration at another end, coating the ends with vulcanizable rubber compound, superposing the ends and vulcanizing the joint.

In witness whereof, I have hereunto signed my name.

ELMER G. KIMMICH.